(12) United States Patent
Lee et al.

(10) Patent No.: US 7,746,033 B2
(45) Date of Patent: Jun. 29, 2010

(54) SECONDARY BATTERY MODULE (75) Inventors: Gun-Goo Lee, Suwon-si (KR); Yoon-Cheol Jeon, Suwon-si (KR); Tae-Yong Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 844 days.

(21) Appl. No.: 11/259,824

(22) Filed: Oct. 26, 2005

(65) Prior Publication Data
US 2006/0091856 A1 May 4, 2006

(30) Foreign Application Priority Data
Oct. 28, 2004 (KR) ............. 10-2004-0086640

(51) Int. Cl.
H02J 7/00 (2006.01)
H02J 7/04 (2006.01)
H01M 10/50 (2006.01)
H01M 2/12 (2006.01)
H01M 2/02 (2006.01)

(52) U.S. Cl. ............ 320/150; 429/120; 429/34; 429/82; 429/83

(58) Field of Classification Search ......... 320/150; 429/72, 73, 62, 120, 163, 148, 99, 149, 34, 429/26, 71
See application file for complete search history.

(56) References Cited

U.S. PATENT DOCUMENTS

| | | | | |
|---|---|---|---|---|
| 5,487,955 A * | 1/1996 | Korall et al. | .......... | 429/26 |
| 5,866,276 A * | 2/1999 | Ogami et al. | .......... | 429/120 |
| 6,225,788 B1 * | 5/2001 | Kouzu et al. | .......... | 320/150 |
| 6,482,542 B1 * | 11/2002 | Takaki et al. | .......... | 429/120 |
| 6,586,132 B1 * | 7/2003 | Fukuda et al. | .......... | 429/120 |
| 2001/0007728 A1 * | 7/2001 | Ogata et al. | .......... | 429/120 |
| 2002/0102454 A1 * | 8/2002 | Zhou et al. | .......... | 429/88 |
| 2003/0211384 A1 * | 11/2003 | Hamada et al. | .......... | 429/120 |
| 2004/0081885 A1 | 4/2004 | Ziegler et al. | | |

(Continued)

FOREIGN PATENT DOCUMENTS

CN 1178398 A 4/1998

(Continued)

OTHER PUBLICATIONS

Japanese Office action dated Sep. 8, 2009, for corresponding Japanese application 2005-314545, noting listed references in this IDS.

Primary Examiner—Edward Tso
Assistant Examiner—Alexis Boateng
(74) Attorney, Agent, or Firm—Christie, Parker & Hale, LLP (57) ABSTRACT

A secondary battery module includes a unit battery aggregate having a plurality of unit batteries arranged spaced from each other; a housing adapted to receive the unit battery aggregate; and a communicating member installed inside the housing, the communicating member adapted to supply a cooling medium flowing into the housing between a plurality of the unit batteries. The housing includes an inlet for flowing temperature control air into the unit battery aggregate, an outlet for flowing out the air passing through the unit battery, and a communicating member arranged perpendicular to the direction of inflow and outflow of the air with respect to the inlet and the outlet to communicate with a flowing channel between unit batteries, respectively.

10 Claims, 7 Drawing Sheets

U.S. PATENT DOCUMENTS

| | | |
|---|---|---|
| 2004/0135550 A1* | 7/2004 | Nishihata et al. ............ 320/150 |
| 2005/0130033 A1 | 6/2005 | Iwamura et al. |
| 2006/0078789 A1* | 4/2006 | Wegner ...................... 429/120 |

FOREIGN PATENT DOCUMENTS

| | | |
|---|---|---|
| CN | 1241305 A | 1/2000 |
| CN | 1290046 A | 4/2001 |
| CN | 1319916 A | 10/2001 |
| EP | 0 964 470 A1 | 12/1999 |
| EP | 1 089 373 A1 | 4/2001 |
| JP | 48-34814 U | 4/1973 |
| JP | 10-003950 | 1/1998 |
| JP | 11-329518 | 11/1999 |
| JP | 2000-243461 | 9/2000 |
| JP | 2001-167806 | 6/2001 |
| JP | 2001-313090 | 11/2001 |
| JP | 2002-050412 | 2/2002 |
| JP | 2003-346923 | 12/2003 |
| KR | 20-0151722 Y | 7/1999 |
| KR | 10-0353998 | 7/2001 |
| WO | WO 03/107458 A1 | 12/2003 |

* cited by examiner

SECONDARY BATTERY MODULE

CROSS-REFERENCE TO RELATED APPLICATION

This application claims priority to and the benefit of Korean Patent Application No. 10-2004-0086640 filed with the Korean Intellectual Property Office on Oct. 28, 2004, the entire content of which is incorporated herein by reference.

BACKGROUND OF THE INVENTION (a) Field of the Invention

The present invention relates to a secondary battery, and more particularly, to a cooling structure for a secondary battery module having a plurality of unit batteries.

(b) Description of the Related Art

Unlike a primary battery, a secondary battery may be recharged. Lower power batteries are used for various portable electronic devices such as cellular phones, laptop computers, and camcorders. Bulk size batteries are used as the power source for motor drive, such as in hybrid electric vehicles.

Depending on their external shape, secondary batteries may be classified into different types, for example, prismatic and cylindrical batteries. When they are used for machines requiring a high power source such as the hybrid electric vehicles, secondary batteries may be in the form of a high power secondary battery module.

A secondary battery module is formed by serially connecting several secondary batteries ("unit battery"). Each of the unit batteries includes an electrode assembly in which a separator is interposed between a positive electrode and a negative electrode. The electrode assembly is inserted into a container, and a cap assembly is assembled with the container to seal the container. If the unit battery is a prismatic type battery, the cap assembly includes a positive terminal and a negative terminal extending from the inside to the outside of the container and electrically connected to a positive electrode and a negative electrode, respectively.

In addition, the positive and negative terminals of one unit battery are arranged to alternate with the positive and negative terminals of an adjacent unit battery. The unit cells are electrically connected to each other to form the secondary battery module by fastening a conductive adaptor to the negative and positive terminals with screw threads on their outer surface.

Since the secondary battery module connects several to tens of unit batteries to form one battery module, there is a need to efficiently dissipate heat generated from each unit battery. In particular, when the secondary battery module is used for vehicles such as electric vehicles and hybrid electric vehicles, the heat dissipation is of significant importance.

If the heat dissipation does not occur properly, the temperature of the secondary battery module may excessively increase due to the heat generated from each unit battery. Accordingly, the secondary battery module and the unit driven by the secondary battery module may malfunction.

In addition, if the secondary battery module includes prismatic type unit batteries, it is more likely to generate excessive heat due to the structural characteristics of the prismatic type.

Accordingly, a cell barrier may be disposed between unit batteries. The space formed between unit batteries by the cell barrier is used not only for cooling unit batteries but also for preventing distortion due to heat expansion of the unit batteries.

However, such a cooling mechanism for secondary battery modules may cause an uneven temperature difference between unit batteries since the amount of cooling air supplied to the space between unit batteries may vary.

Accordingly, the secondary battery module is not able to maximize its characteristics such as charge-discharge characteristic, decreasing the efficiency of the modules.

SUMMARY OF THE INVENTION

In accordance with the present invention, a secondary battery module is provided in which a cooling medium can be uniformly circulated between a plurality of unit batteries.

According to one embodiment of the present invention, a secondary battery module includes a plurality of unit batteries spaced from each other; a housing for receiving the plurality of unit batteries; and a communicating member located inside the housing, the communicating member adapted to channel between the plurality of the unit batteries a cooling medium flowing into the housing.

The plurality of unit batteries include a cell barrier disposed between each of the unit batteries, the cell barrier having a channel for the cooling medium to pass through.

The housing may include a plurality of detachable sub housings, and one of the sub housings may have an inlet and an outlet for channeling the cooling medium perpendicular to the interfacial surfaces of the unit batteries.

The communicating member may include a plurality of guiders installed inside the housing spacing apart at a space interval corresponding to a space between the unit batteries.

The plurality of the guiders may be disposed at either side of the unit battery aggregate to face each other with respect to the plurality of unit batteries. The guiders may be integrally formed with the housing.

The communicating member may include a body, and the body may have a guide channel communicating with a space between the unit batteries.

The space interval between a plurality of the guiders may gradually widen as they become more distal from the inlet of the cooling medium.

A plurality of the unit batteries may be mounted in a package portion to form a unit battery group, and a plurality of the unit battery groups may be spaced from each other to form the unit battery aggregate, and the cooling medium may be supplied between the unit battery groups.

Additionally provided is a method of ventilating temperature controlling air through a battery module formed from a plurality of neighboring unit cells. The method includes forming a unit cell assembly such that each of the neighboring unit cells are separated from each other by an adjacent ventilation channel, each ventilation channel having a ventilation channel air input interface and a ventilation channel air output interface. The method further includes mounting the unit cell assembly in a cooling unit receptor, the cooling unit receptor being coupled to a cooling unit air inlet and a cooling unit air outlet such that the cooling unit input channels the temperature controlling air into each ventilation channel air input interface and the cooling unit air outlet receives the temperature cooling air from each ventilation channel air output interface. The cooling unit receptor has a plurality of guiders to channel the temperature controlling air into each ventilation channel

DETAILED DESCRIPTION

Figure 1:
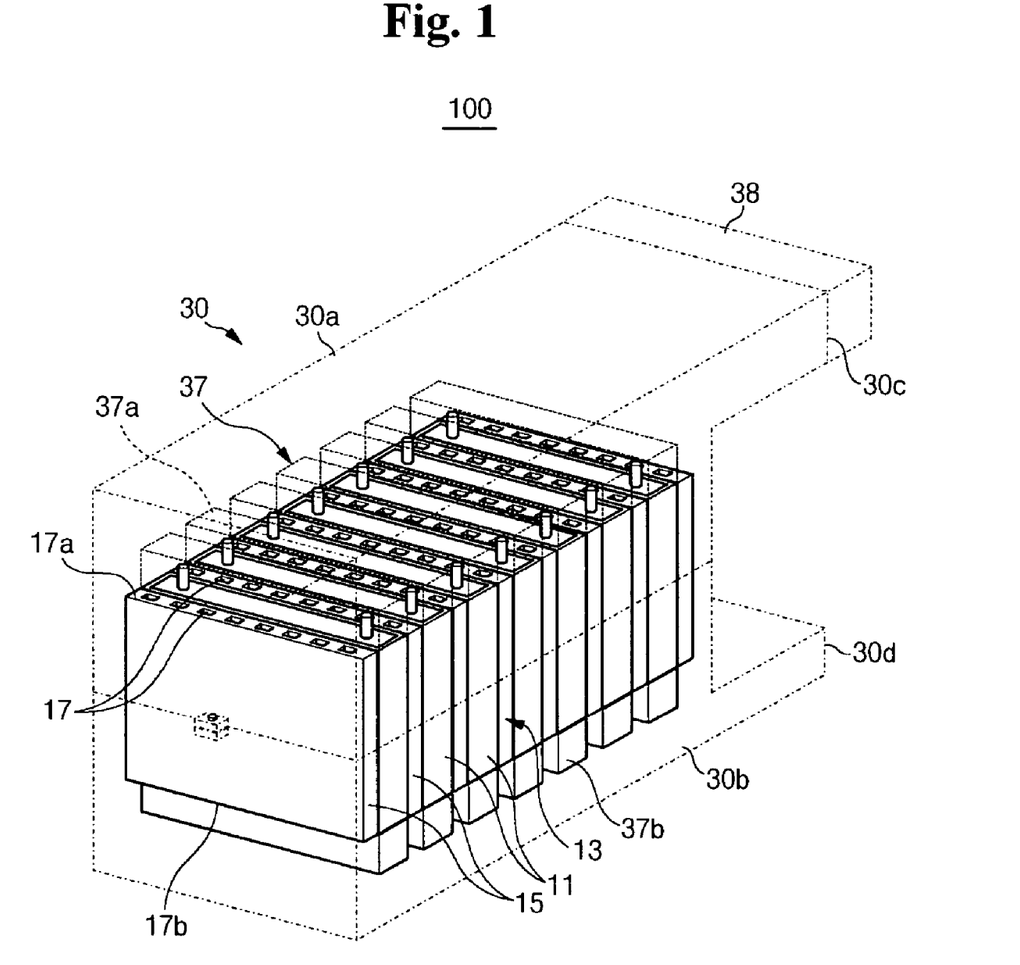
FIG. 1 is a perspective view of a secondary battery module according to one embodiment of the present invention.
Figure 2:
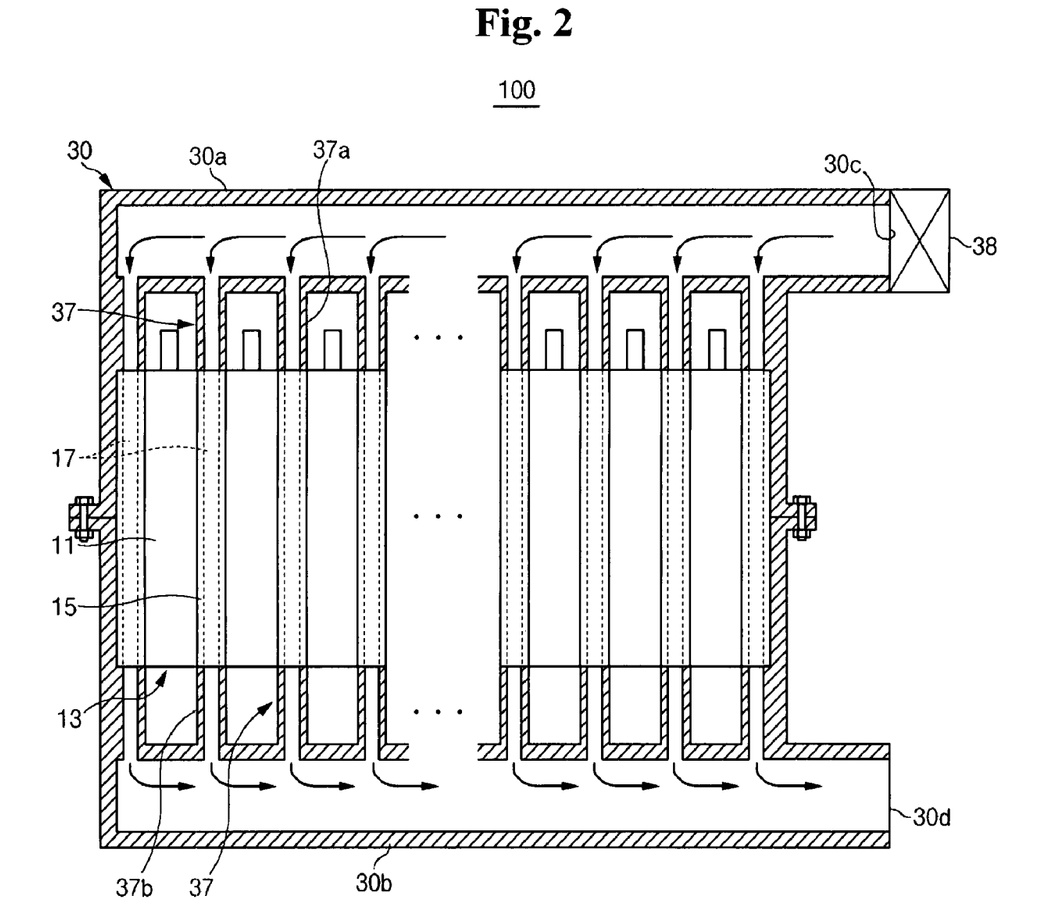
FIG. 2 is a cross-sectional view of the secondary battery module according to the embodiment of FIG. 1.

With reference to FIG. 1 and FIG. 2, a secondary battery module 100 according to one embodiment of the present invention includes a plurality of unit batteries 11 spaced from each other.

Each of the unit batteries 11 includes an electrode assembly in which a separator is interposed between a positive electrode and a negative electrode, which allows the secondary battery to charge and discharge a predetermined amount of electric power.

Each of the unit batteries 11 according to the present embodiment has a substantially prismatic shape.

A cell barrier 15 is installed between the unit batteries 11 and at the outermost unit battery 11 to maintain a space interval between the unit batteries 11 and to support the side of each unit battery 11.

Each of the cell barriers 15 has a channel 17 through which cooling air of relatively low temperature is circulated. The channel 17 is formed with at least one tunnel passing through the body of the cell barrier 15 from edge 17a to edge 17b.

In the present embodiment, a plurality of the unit batteries 11 are continuously spaced by the cell barrier 15 to form a unit battery aggregate 13 having a structure that can circulate air to control the temperature between unit batteries 11. The unit batteries 11 and the cell barriers 15 may be fastened to each other by a fastener not shown in the drawing (for example, end plates disposed at both of the outermost sides of the aggregate and a restraint rod attached to the end plates by a screw thread to fix the unit batteries and the cell barriers) to form an assembly.

The unit battery aggregate 13 is installed inside a housing 30 forming the secondary battery module 100. The unit battery aggregate 13 may be fixed and installed in the housing 30 by detachably combining a separate bracket or an end plate with the housing 30.

The housing 30 of the present embodiment includes two separable top and bottom sub housings 30a, 30b, which may be fixed by a screw thread or any other fastening means.

The housing 30 receives the unit battery aggregate 13 inside its inner space to form a secondary battery module 100. It also circulates cooling air as a cooling medium from outside to inside to dissipate heat generated from the unit batteries 11 of the unit battery aggregate 13.

As described above, the housing 30 of the present embodiment has a receiving space to fix the unit battery aggregate 13 and includes sub housings 30a, 30b to form a secondary battery module 100.

Furthermore, the housing 30 includes an inlet 30c and an outlet 30d to channel cooling air into the inside of the housing or to channel cooling air out from the inside. The inlet 30c and the outlet 30d of the present embodiment are formed on the sub housings 30a and 30b, respectively, such that they are both arranged on the same side of the housing 30.

A communicating member 37 is installed in the housing 30 to provide a flowing channel communicating individually with each of the channels 17 between the unit batteries 11. The communicating member 37 may be integrally formed with the housing 30, or it may be separately formed and installed in the housing 30 with separate connecting means. The present embodiment shows an integrally formed communicating member.

The communicating member 37 of the present embodiment is formed with a girder shape, and has a plurality of guiders 37a, 37b integrally formed with the sub housings 30a and 30b, respectively.

The guiders 37a, 37b have an inner space, and are disposed above and below the unit batteries 11 to cover them. The guiders 37a, 37b with the above structure have a space interval corresponding to the cell barrier 15.

The inlet 30c of the housing 30 is connected to a cooling medium supply assembly 38. The cooling medium supply assembly 38 has a fan for intaking air with a predetermined rotational force and blowing it into the housing 30.

In the secondary battery module 100 as described above, the temperature control air channeled into the inlet 30c by the cooling medium supply assembly 38 flows perpendicular to the interfacial surfaces of the unit batteries 11, and is induced to pass through the channels 17.

During this process, the heat generated from the unit batteries 11 may be cooled by the air. Warmed air then flows out of the housing 30 through the outlet 30d.

In further detail, the guiders 37a, 37b of the secondary battery module 100 form a separate space inside the housing 30, and they are disposed perpendicular to the direction of the inflow of cooling air into the housing 30. The guiders 37a, 37b guide the cooling air to flow into channels 17 formed in the cell barrier 15. Therefore, a predetermined amount of air may be supplied between the unit batteries 11.

Accordingly, heat generated from each unit battery 11 may be cooled with uniform temperature distribution, and the unit battery aggregate 13 can maintain an appropriate temperature over its entire area, providing for efficient functioning of the battery.

Figure 3:
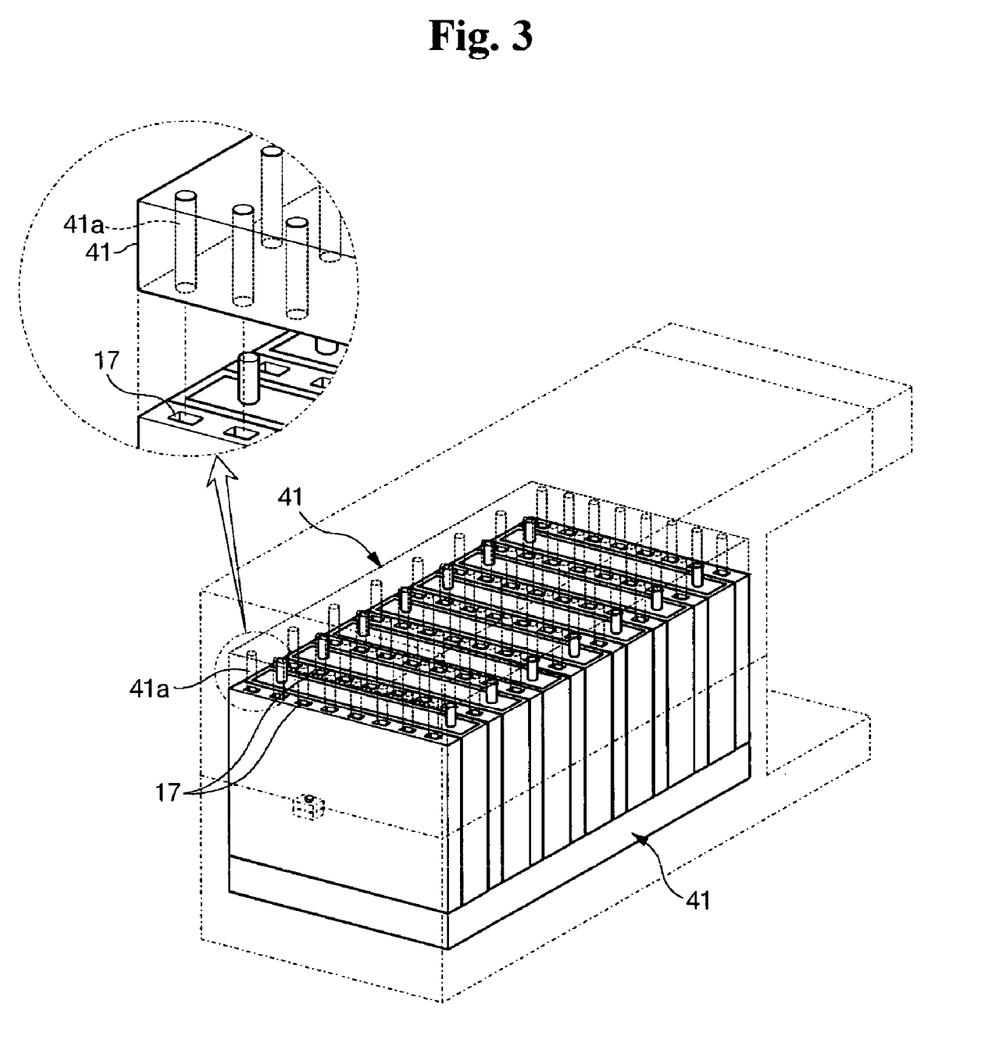
FIG. 3 is a cross-sectional view of a secondary battery module according to another embodiment of the present invention.

In one exemplary embodiment, guiders 37a, 37b may be integrally formed with a communicating member 41 as shown in FIG. 3. The guide channel 41a formed in the body of the communicating member 41 allows one-to-one correspondence to the channel 17.

Figure 4:
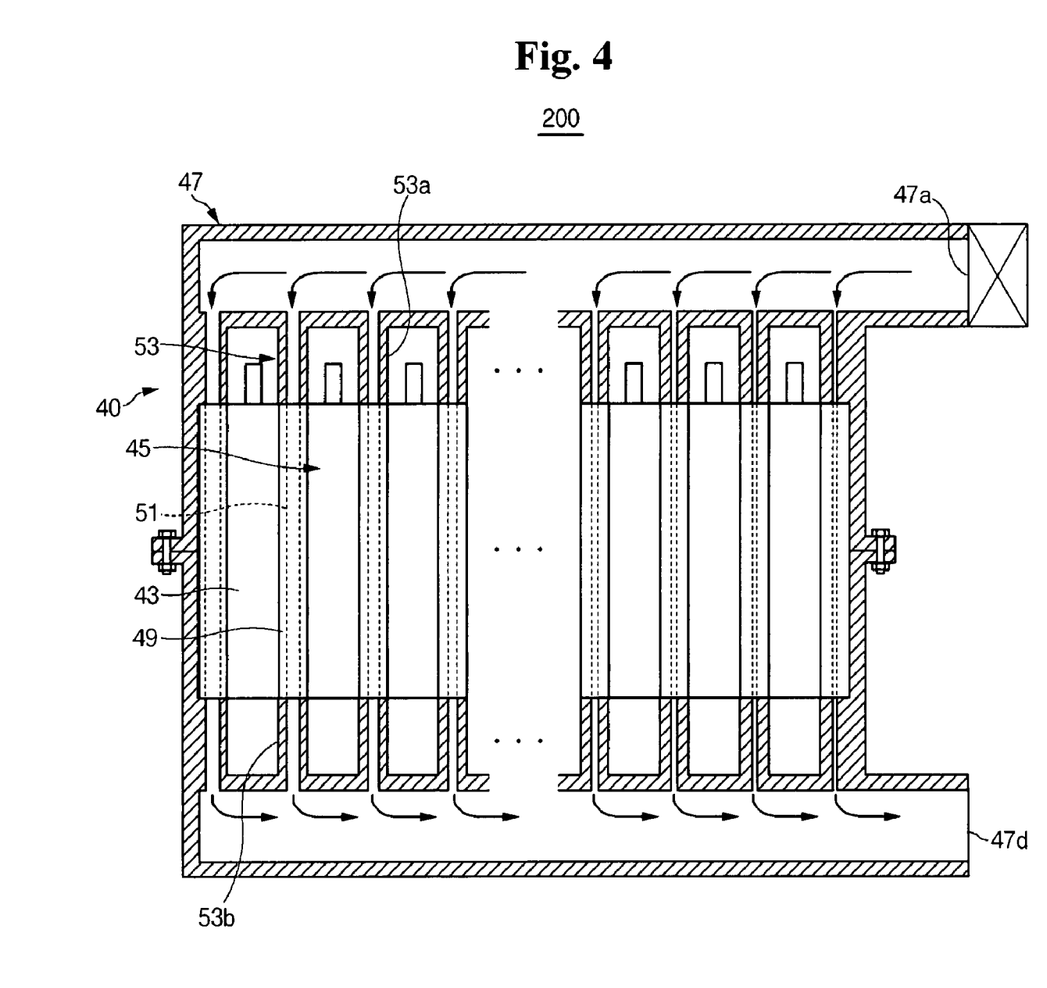
FIG. 4 is a cross-sectional view of a secondary battery module according to yet another embodiment of the present invention.

FIG. 4 is a cross-sectional view of a secondary battery module according to another embodiment of the present invention.

With reference to the drawing, the secondary battery module 200 according to the present embodiment has substantially the same structure as the above-described secondary battery.

The amount of the cooling air supplied between the unit batteries 43 disposed more distal to the inlet 47a may be less than the amount of the cooling air supplied between the unit batteries 43 disposed more proximal to the inlet 47a.

Thus, when the unit battery aggregate 45 is formed, the space interval between the unit batteries 43 is gradually widened between neighboring unit batteries more distal from the inlet 47a. In addition, the cross-sectional area of the channel 51 formed inside the cell barrier 49 disposed between the unit batteries 43 is gradually increased the more distal neighboring unit batteries are from the inlet 47a.

The communicating member 53 and the guiders 53a, 53b are disposed above and below the unit battery aggregate 45.

As shown in FIG. 4, the interval between the guiders 53a, 53b gradually widens between neighboring unit batteries 43 more distal from the inlet 47a.

The other structures of the secondary battery module are the same as the previous embodiment, and thereby the detailed explanation thereof is omitted.

According to the secondary battery module 200 with the above structure, the cooling air flowing into the housing 47 through the inlet 47a moves perpendicular to interval surfaces of the unit batteries 43, and is induced to the channel 51 between the upper guiders 53a disposed in the upper portion of the unit battery aggregate 45 to pass between the unit batteries 43.

During this process, the heat generated from each unit battery 43 may be exchanged with the air passing through the channel 51. The heat exchanged air is induced through the space between the lower guiders 53b disposed in the lower portion of the unit battery aggregate 45, and moves perpendicular to the interval surfaces of the unit batteries 43 in the reverse direction to the inflow of the cooling air, ultimately exiting the housing 47 through the outlet 47d.

Although the flow velocity of the cooling air supplied between the unit batteries 43 is gradually slower more distal from the inlet 47a, the aperture ratio of the space between the unit batteries 43 where the cooling air is channeled is gradually increased in the same direction. Therefore, the amount of the cooling air supplied between the unit battery units 43 may be substantially uniform.

Accordingly, the heat generated from each unit battery 43 of the unit battery aggregate 45 can be cooled with uniform temperature distribution, and thereby, the unit battery aggregate 45 can appropriately maintain a consistent temperature over its entire area.

In an alternate embodiment of the present invention, the space intervals between the guiders of the communicating member are different at each position of the unit batteries in the housing to maintain a whole temperature of the unit battery aggregate uniform. Additionally, the widths of the guiders may be varied while the space intervals of the guiders are maintained the same with respect to each other.

The structure of the guider of the communicating member of FIG. 3 may also be used. It is also possible to maintain the space intervals between the unit batteries and vary only the space intervals between the guiders.

Figure 5:
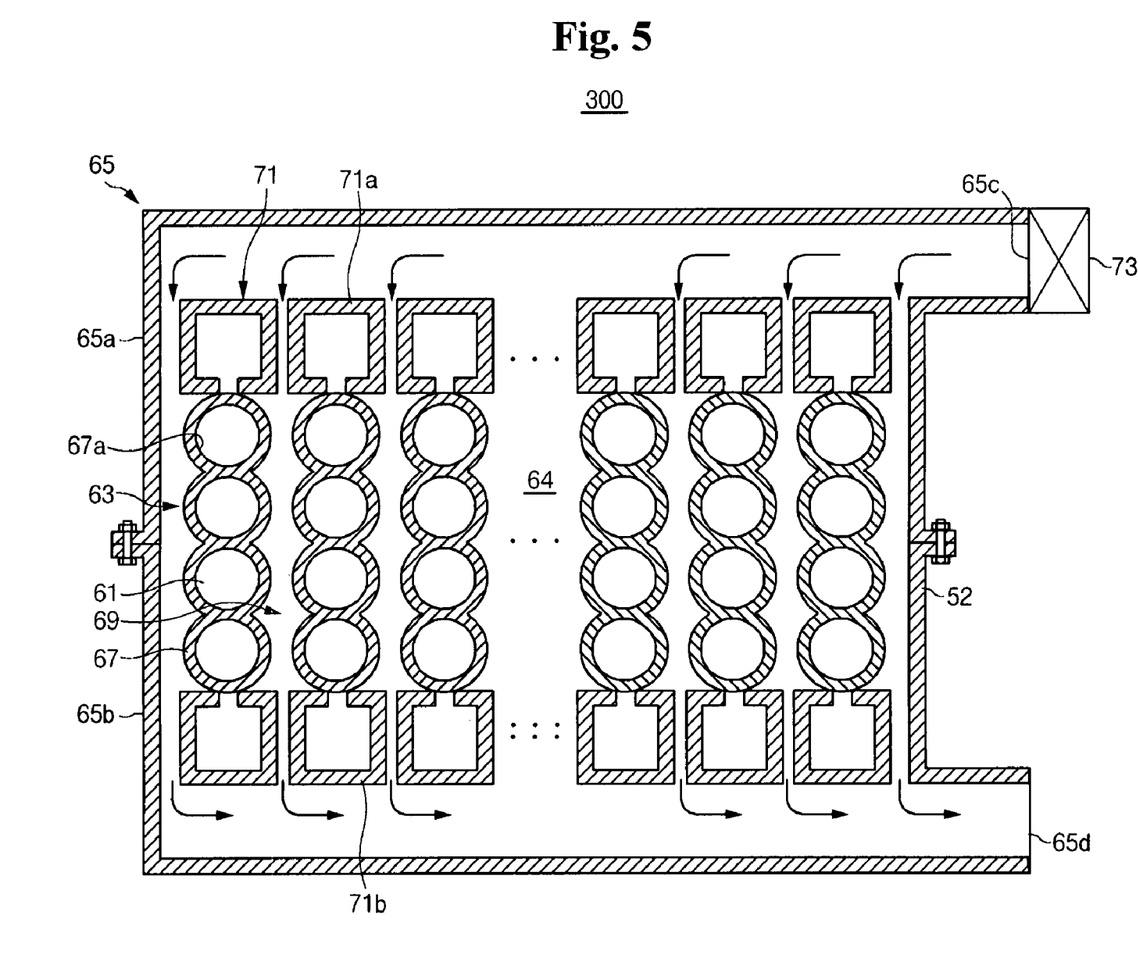
FIG. 5 is a cross-sectional view of a secondary battery module according to still another embodiment of the present invention.

FIG. 5 is a cross-sectional side view of a secondary battery module according to another embodiment of the present invention.

With reference to the drawing, the battery module 300 according to the present embodiment includes at least two unit battery groups 63 having a plurality of unit batteries 61 spaced from each other and a housing 65 receiving the unit battery groups 63. The housing circulates the temperature control air flowing from the exterior into the space between the unit battery groups 63, and then allows it to return to the exterior.

The unit battery 61 according to the present embodiment has a substantially cylindrical shape, and the plural unit batteries are mounted in a package portion 67 to form a unit battery group 63. The unit battery groups are continuously spaced to form a unit battery aggregate 64.

The package portion 67 is made of material with an insulative property and relatively good thermal conductivity, and has a container shape. The package portion 67 includes a plurality of inserting holes 67a into which the unit batteries 61 are inserted. The unit battery 61 may be fastened to the inserting hole 67a by forced insertion or they may be fixed to the package portion 67 by separate fixing means.

The housing 30 of the present embodiment includes two separable top and bottom sub housings 65a, 65b such as the above-described embodiments. The sub housings 65a, 65b have an inlet 65c for channeling cooling air from outside of the housing 65 therein and an outlet 65d for channeling the heat exchanged air from the inside of the housing 65 to the exterior, respectively.

There is no limitation on the housing structure as long as the housing 65 can receive the unit battery groups 63 and the unit battery groups 63 can be spaced to form a channel 69 therebetween.

In addition, the secondary battery module 300 according to the present embodiment also has a communicating member 71 installed in the sub housings 65a, 65b to provide an air flowing channel communicating with the channel 69 between the unit battery groups 63, and the inlet 65c connected to a cooling medium supply assembly 73.

The structure of the communicating member 71 and the cooling medium supply assembly 73 may be substantially the same as described previously. Moreover, the arrangement of the unit battery groups 63 and the guiders 71a, 71b of the communicating member 71 may also be substantially the same as described previously.

Like the secondary battery module according to previous embodiments, the secondary battery module 300 with the above structure circulates cooling air flowing from the outside of the housing 65 to the space between the unit battery groups 63 to cool the unit battery 61 by heat exchange, and channels the heat exchanged air outside the housing 65.

Figure 6:
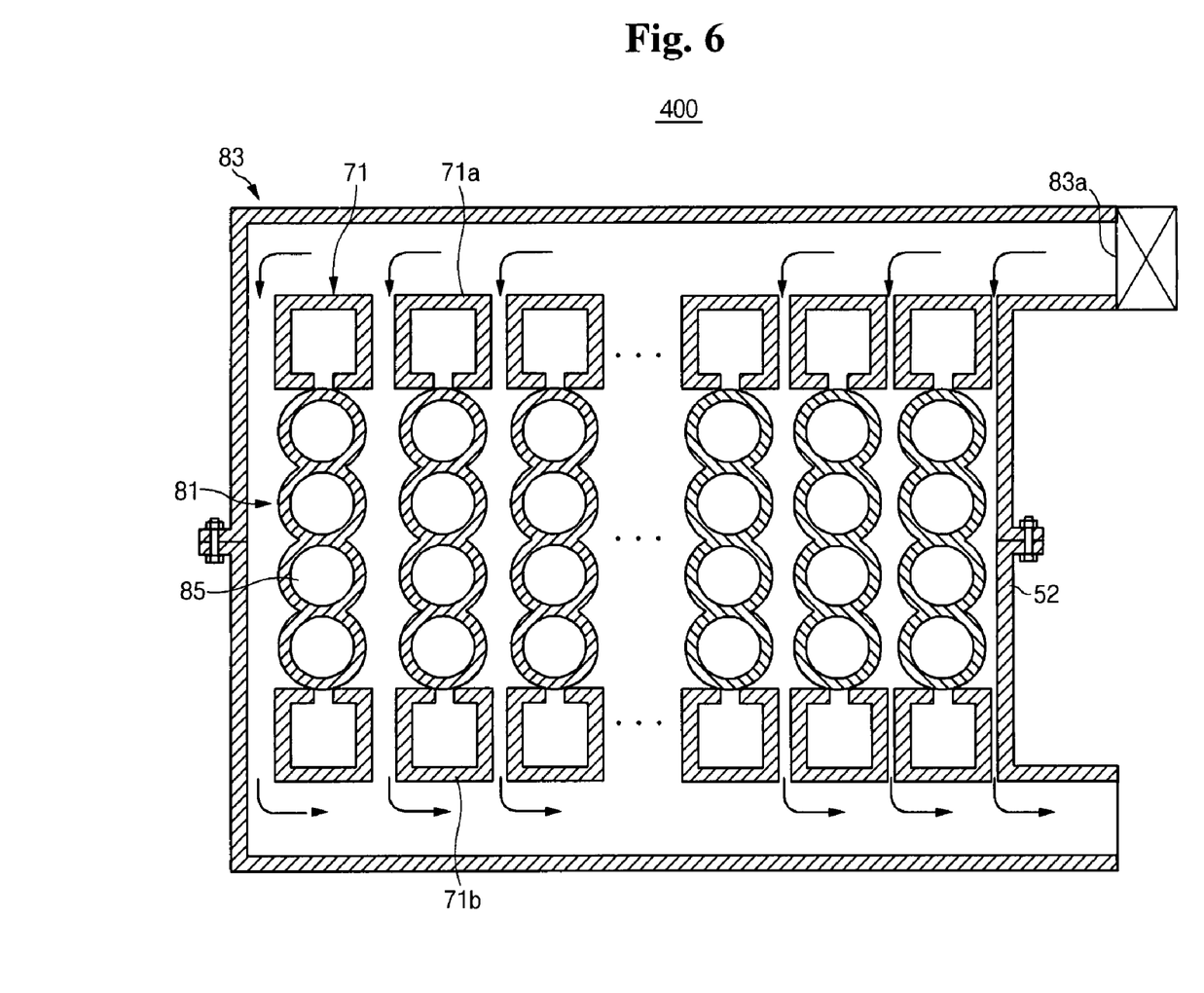
FIG. 6 is a cross-sectional view of a secondary battery module according to another embodiment of the present invention.

FIG. 6 is a cross-sectional side view of a secondary battery module according to still another embodiment of the present invention.

The secondary battery module 400 according to embodiment has the same basic structure as that of previously described embodiments, but the arrangement of the unit battery groups 81 corresponds to the arrangement of the unit battery of the secondary battery module shown in FIG. 4.

That is, when the unit battery aggregate 81 of the secondary battery module 400 is disposed in the housing 83, the space interval thereof is arranged to be gradually increased as it is more distal from the inlet 83a of the housing 83.

The cooling mechanism in the secondary battery module is the same as that previously described with FIG. 4, and thereby the detailed explanation thereof is omitted.

The secondary battery module according to embodiments of the present invention may be used as the power source for motor driving devices requiring high power characteristics, such as the hybrid electric vehicles, electric vehicles, wireless vacuum cleaners, motorbikes, or motor scooters.

Figure 7:
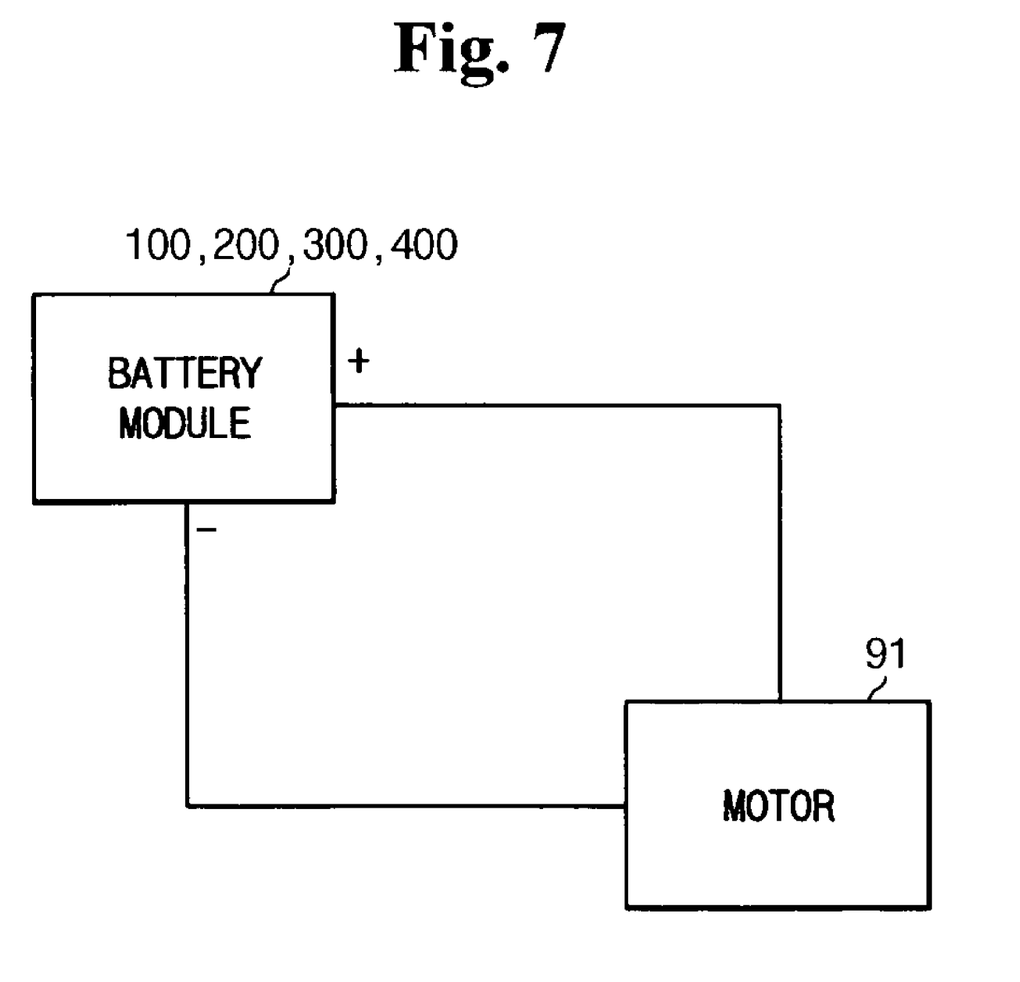
FIG. 7 is a block diagram schematically illustrating a motor drivable by the secondary battery module of the present invention.

FIG. 7 is a block diagram schematically illustrating driving the motor 91 by the secondary battery modules 100, 200, 300, and 400 shown in FIG. 1 to FIG. 6.

According to embodiments of the present invention, the circulating structure of cooling air is improved so that a constant amount of air can be circulated in a channel between a plurality of unit batteries or a plurality of unit battery aggregates to thereby achieve a uniform temperature distribution over the entire area of unit battery aggregates.

Accordingly, the secondary battery module of the present invention can maximize the cooling efficiency of the whole unit battery aggregates to thereby further enhance the charge and discharge efficiency.

Although exemplary embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery module comprising:
    a housing;
    a unit battery aggregate within the housing, the unit battery aggregate comprising a plurality of unit batteries;
    a cell barrier between each of a pair of neighboring unit batteries of the plurality of unit batteries, each cell barrier including a plurality of cooling medium channels having a channel input and a channel output; and
    a communicating member within the housing, the communicating member adapted to channel a cooling medium through the plurality of cooling medium channels;
    wherein the communicating member comprises a plurality of guiders, each of a pair of neighboring guiders of the plurality of guiders being spaced by a distance about equal to a distance between each of a pair of corresponding neighboring unit batteries of the plurality of unit batteries.

2. The secondary battery module of claim 1, wherein the housing includes a plurality of detachable sub housings, at least one of the plurality of detachable sub housings having at least one of a cooling medium inlet or a cooling medium outlet.

3. The secondary battery module of claim 1, wherein the plurality of guiders extend from at least one of a top end or a bottom end of each of the plurality of unit batteries.

4. The secondary battery module of claim 1, wherein the plurality of guiders are integral with the housing.

5. The secondary battery module of claim 1 the communicating member including a plurality of guide channels, each of the plurality of guide channels communicating with one of the plurality of cooling medium channels.

6. The secondary battery module of claim 1, wherein a width of each of the plurality of cooling medium channels increases for each cell barrier more distal from the housing inlet.

7. The secondary battery module of claim 1, wherein each of the plurality of unit batteries has a prismatic shape.

8. The secondary battery module of claim 1, wherein each of the plurality of unit batteries has a cylindrical shape.

9. The secondary battery module of claim 1, wherein the cooling medium is air.

10. The secondary battery module of claim 1, wherein the secondary battery module drives a motor.

* * * * *